United States Patent [19]

Tanahashi et al.

[11] Patent Number: 5,722,238
[45] Date of Patent: Mar. 3, 1998

[54] DEVICE FOR EVALUATING CATALYST PERFORMANCE DETERIORATION

[75] Inventors: Toshio Tanahashi, Susono; Masakatsu Sanada, Numazu; Koji Yokota, Nagoya; Shinichi Matsunaga, Owariasahi; Hideo Sobukawa, Nisshin; Ichiro Konomi; Tadashi Suzuki, both of Seto, all of Japan

[73] Assignees: Toyota Jidosha Kabushiki Kaisha, Toyota; Kabushiki Kaisha Toyota Chuo Kenkyusho, Aichi, both of Japan

[21] Appl. No.: 734,774

[22] Filed: Oct. 22, 1996

[30] Foreign Application Priority Data

Oct. 25, 1995 [JP] Japan ................... 7-277780
Jun. 21, 1996 [JP] Japan ................... 8-161999

[51] Int. Cl.⁶ ....................................... F01N 3/20
[52] U.S. Cl. ....................................... 60/276; 60/277
[58] Field of Search ...................... 60/276, 277, 285

[56] References Cited

U.S. PATENT DOCUMENTS 5,341,642  8/1994  Kurihara et al. .............. 60/277 X
5,649,420  7/1997  Mukaihira et al. ............ 60/277 X

FOREIGN PATENT DOCUMENTS 7-119447   5/1995   Japan .
WO 95/17588  6/1995  WIPO .

OTHER PUBLICATIONS

"Patent Abstracts Of Japan", vol. 8, No. 1996, abstract of JP-8-93456, Aug. 1996.

"Patent Abstracts Of Japan", vol. 10, No. 1996, abstract of JP-8-158857, Oct. 1996.

"Patent Abstract Of Japan", vol. 18, No. 671 (M-1726), abstract of JP-6-264725, Dec. 1994.

*Primary Examiner*—Tony M. Argenbright
*Attorney, Agent, or Firm*—Oliff & Berridge, PLC

[57] ABSTRACT

A device for evaluating catalyst performance deterioration includes an air-fuel ratio sensor and a temperature sensor. The degree of catalyst performance deterioration per unit time is calculated based on the concentration of oxygen in the exhaust gas and the temperature of the catalyst. The deterioration of the catalyst is evaluated on the basis of the accumulated value of the degree of catalyst performance deterioration per unit time.

14 Claims, 15 Drawing Sheets

DEVICE FOR EVALUATING CATALYST PERFORMANCE DETERIORATION

BACKGROUND OF THE INVENTION

1. Field of the Invention

The present invention relates to a device for evaluating catalyst performance deterioration.

2. Description of the Related Art

The exhaust gas purification device of an internal combustion engine, for example, an exhaust gas purification catalyst, gradually deteriorates while being used. The performance in purifying the exhaust gas gradually declines along with this. If the purification performance of the exhaust gas declines, atmospheric pollution is increased, so control of atmospheric pollution requires determination of what degree the purification performance has currently declined to. Known in the art is a device for detecting the catalyst performance deterioration which calculates the degree of catalyst performance deterioration in a unit time from the temperature of the catalyst detected, accumulating the degree of catalyst performance deterioration in a unit time and evaluating the catalyst performance deterioration from this accumulated value (see Japanese Unexamined Patent Publication (Kokai) No. 7-119447).

Generally speaking, in most cases, when the temperature rises, deterioration of materials always advances. Similarly, the catalyst deteriorates as the temperature rises. Accordingly, the above device for detecting the catalyst performance deterioration evaluates the catalyst performance deterioration by finding in advance the relationship between the degree of catalyst performance deterioration and the temperature of the catalyst and calculating the degree of catalyst performance deterioration based on this relationship.

In the case of a catalyst, however, it was found that the concentration of oxygen in the exhaust gas has a greater effect on the catalyst performance deterioration than the temperature of the catalyst. Accordingly, even if calculating the degree of catalyst performance deterioration based on just the temperature of the catalyst as in this device for detecting the catalyst performance deterioration, the calculated degree of catalyst performance deterioration does not accurately express the actual degree of catalyst performance deterioration and therefore there is a problem that the catalyst performance deterioration could not be accurately judged.

SUMMARY OF THE INVENTION

An object of the present invention is to provide a deterioration evaluation device capable of accurately evaluating the catalyst performance deterioration.

According to the first aspect of the present invention, there is provided a device for evaluating performance deterioration of an exhaust gas purifying catalyst, comprising: temperature detecting means arranged in an exhaust passage for detecting a temperature of an exhaust gas purifying catalyst; oxygen concentration detecting means arranged in the exhaust passage for detecting a concentration of oxygen contained in an exhaust gas; calculating means for calculating a degree of catalyst performance deterioration in a predetermined period on the basis of the temperature of the catalyst detected by the temperature detecting means and the concentration of oxygen detected by the oxygen concentration detecting means; accumulating means for cumulatively adding the degree of catalyst performance deterioration in the predetermined period to obtain an accumulated value; and evaluating means for evaluating the catalyst performance deterioration on the basis of the accumulated value.

According to the second aspect of the present invention, there is provided a device for evaluating performance deterioration of an exhaust gas purifying catalyst, in which the degree of catalyst performance deterioration in the predetermined period is calculated based on a ratio of catalyst performance deterioration, K.

According to the third aspect of the present invention, there is provided a device for evaluating performance deterioration of an exhaust gas purifying catalyst, in which K is calculated based on the following equation:

$$\ln K = C_1 - C_2 \cdot (1/T) + \alpha \ln [O_2]$$

where, $C_1$, $C_2$, and $\alpha$ are constants, T is an absolute temperature of the catalyst, and $[O_2]$ is the concentration of oxygen in the exhaust gas.

According to the fourth aspect of the present invention, there is provided a device for evaluating performance deterioration of an exhaust gas purifying catalyst, in which K is expressed by a rate of change of a purification ratio $\psi$ of the exhaust gas shown by the following equation:

$$\psi = \psi_0 - A \cdot \exp(-B/T) \cdot [O_2]^\alpha \cdot t^m$$

where, $\psi_0$ is a purification ratio of the exhaust gas at the time of start of use of the catalyst, A, B, and $\alpha$ are constants, T is an absolute temperature of the catalyst, $[O_2]$ is a concentration of oxygen in the exhaust gas, t is an operating time, and m is a positive value of not more than 1.0.

The three-way catalyst 10 in FIG. 1 gradually deteriorates along with use due to the various stresses placed on the three-way catalyst 10. As for the stresses causing deterioration of the three-way catalyst 10, giving typical ones, mention may be made of the temperature of the three-way catalyst 10, the concentration of oxygen in the exhaust gas, the poisoning by the catalyst poison contained in the fuel and oil, corrosion due to rain, snow, and salt, and vibration. These were examined by experiments and studies, whereupon it was found that factors other than the temperature of the catalyst, the concentration of oxygen in the exhaust gas, and the poisoning had almost no effect on the deterioration of the three-way catalyst 10 and that the deterioration of the three-way catalyst 10 is dominated by the temperature of the catalyst, the concentration of oxygen in the exhaust gas, and the poisoning.

That is, when the temperature of the three-way catalyst 10 rises, the sintering action of the precious metal particles in the catalyst is promoted and therefore the deterioration of the three-way catalyst 10 is promoted. There are precious metals of which the sintering action is promoted when the concentration of oxygen in the exhaust gas increases, that is, precious metals of which the deterioration progresses when the concentration of oxygen in the exhaust gas increases, and precious metals of which the sintering action is promoted when the concentration of oxygen in the exhaust gas decreases, that is, precious metals of which the deterioration progresses when the concentration of oxygen in the exhaust gas decreases. Further, in some cases the oil contains catalyst poison which accumulate in the three-way catalyst 10. In this case, the active surface of the catalyst is gradually covered by the catalyst poison, so the three-way catalyst 10 gradually deteriorates also with time.

Accordingly, when using a precious metal of which the deterioration progresses when the concentration of oxygen in the exhaust gas increases or a precious metal of which the deterioration progresses when the concentration of oxygen in the exhaust gas decreases and the oil which contains an accumulative type catalyst poison, as explained above, the deterioration of the three-way catalyst 10 is governed by the temperature of the catalyst, the concentration of oxygen in the exhaust gas, and the poisoning. As opposed to this, when the oil does not contain any accumulative type catalyst poison, the deterioration of the three-way catalyst 10 becomes governed by the temperature of the catalyst and the concentration of oxygen in the exhaust gas.

Next, an explanation will be made of the purification ratio $\psi$ of the exhaust gas by the three-way catalyst 10 referring to FIG. 3. Note that in FIG. 3 the horizontal axis shows the engine operating time, while $\psi_1$, $\psi_2$, $\psi_3$, $\psi_4$, and $\psi_5$ show the purification ratio $\psi$ of the exhaust gas in the case of changing the temperature of the three-way catalyst 10 and the concentration of the oxygen in the exhaust gas. Further, FIG. 3 shows the case of use of a precious metal of which the deterioration progresses when the concentration of oxygen in the exhaust gas increases as the precious metal of the three-way catalyst 10 and oil which does not contain any accumulative type catalyst poison as the oil.

Referring to FIG. 3, $\psi_1$ shows the case of operating the engine in a steady state where the temperature of the catalyst is maintained at 860° C. and the air-fuel ratio is made rich, $\psi_2$ shows the case of operating the engine in a steady state where the temperature of the catalyst is maintained at 800° C. and feedback control is used to maintain the air-fuel ratio at the stoichiometric air-fuel ratio, $\psi_3$ shows the case of operating the engine in a steady state where the temperature of the catalyst is maintained at 900° C. and feedback control is used to maintain the air-fuel ratio at the stoichiometric air-fuel ratio, $\psi_4$ shows the case of operating the engine in a steady state where the temperature of the catalyst is maintained at 700° C. and the injection of fuel is stopped, and $\psi_5$ shows the case of operating the engine in a steady state where the temperature of the catalyst is maintained at 825° C. and the injection of fuel is stopped.

From the curves $\psi_1$, $\psi_2$, $\psi_3$, $\psi_4$, and $\psi_5$ of FIG. 3, it is learned that the purification ratio $\psi$ of the exhaust gas gradually becomes lower the longer the operating time. Note that FIG. 3 shows the case of use of fuel and oil not containing any accumulative type catalyst poison and accordingly the degree of decrease of the purification ratio $\psi$ of the exhaust gas in FIG. 3 shows the degree of deterioration of the three-way catalyst 10. The present invention makes it possible to mathematically obtain the time course of deviation of a purification ratio from an initial purification ratio based upon running conditions and calculate a purification ratio at the present time from the sum of all the deviations.

BRIEF DESCRIPTION OF THE DRAWINGS

The present invention may be more fully understood from the description of preferred embodiments of the invention set forth below, together with the accompanying drawings, in which.

DESCRIPTION OF THE PREFERRED EMBODIMENTS

Figure 1:
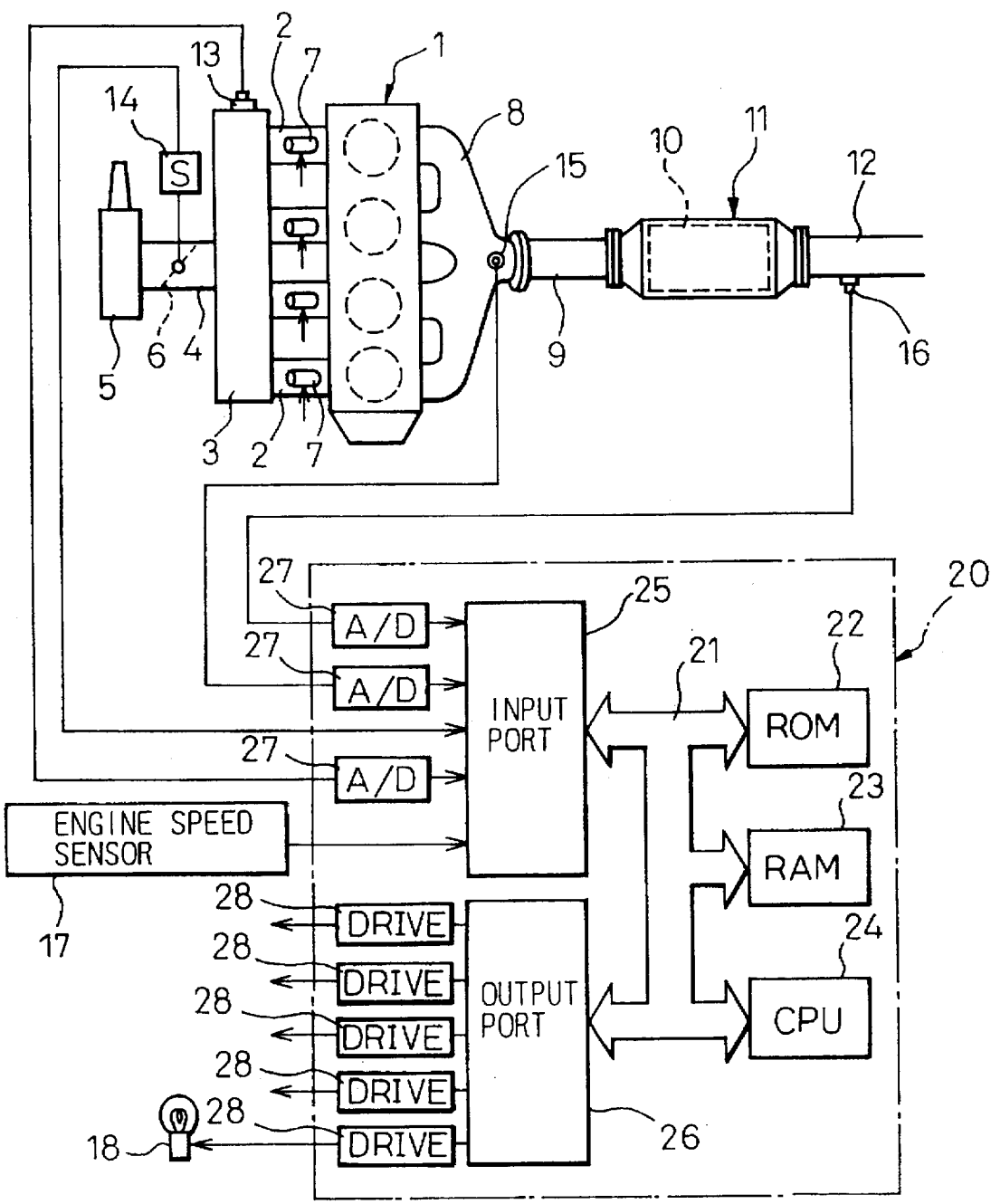
FIG. 1 is an overview of the engine including an example of a device of the present invention.

Referring to FIG. 1, 1 is an engine body, 2 are intake pipes, 3 is a surge tank, 4 is an intake duct, 5 is an air cleaner, 6 is a throttle valve arranged in the intake duct 4, and 7 is a fuel injector mounted in each of the intake pipes 2. An exhaust manifold 8 is attached to the engine body 1. The exhaust manifold 8 is connected through an exhaust pipe 9 to a catalytic converter 11 containing a catalyst 10. In the engine shown in FIG. 1, the catalyst 10 is comprised of a three-way catalyst.

An electronic control unit 20 is comprised of a digital computer which is provided with a read only memory (ROM) 22, random access memory (RAM) 23, central processing unit (CPU) 24, input port 25, and output port 26 connected with each other by a bidirectional bus 21. As shown in FIG. 1, a pressure sensor 13 is arranged in the surge tank 3 for generating an output voltage proportional to the absolute pressure in the surge tank 3. The output voltage of the pressure sensor 13 is input through the corresponding AD converter 27 to the input port 25. The throttle valve 6 is provided with a throttle sensor 14 generating an output signal showing if the throttle valve 6 is in the idling position. The output signal of the throttle sensor 14 is input to the input port 25.

Further, an air-fuel ratio sensor 15 is arranged in the exhaust manifold 8 to detect the air-fuel ratio. The output signal of the air-fuel ratio sensor 15 is input through the corresponding AD converter 27 to the input port 25. Further, a temperature sensor 16 for generating an output voltage proportional to the temperature of the exhaust gas is arranged in the exhaust passage 12 connected to the outlet of the exhaust gas of the catalyst converter 11. The output voltage of this temperature sensor 16 is input through a corresponding AD converter 27 to the input port 25. Further, an engine speed sensor 17 is connected to the input port 25 for generating an output pulse showing the engine speed. On the other hand, the output port 26 is connected through the corresponding drive circuit 28 to the fuel injectors 7 and an alarm lamp 18.

Figure 2:
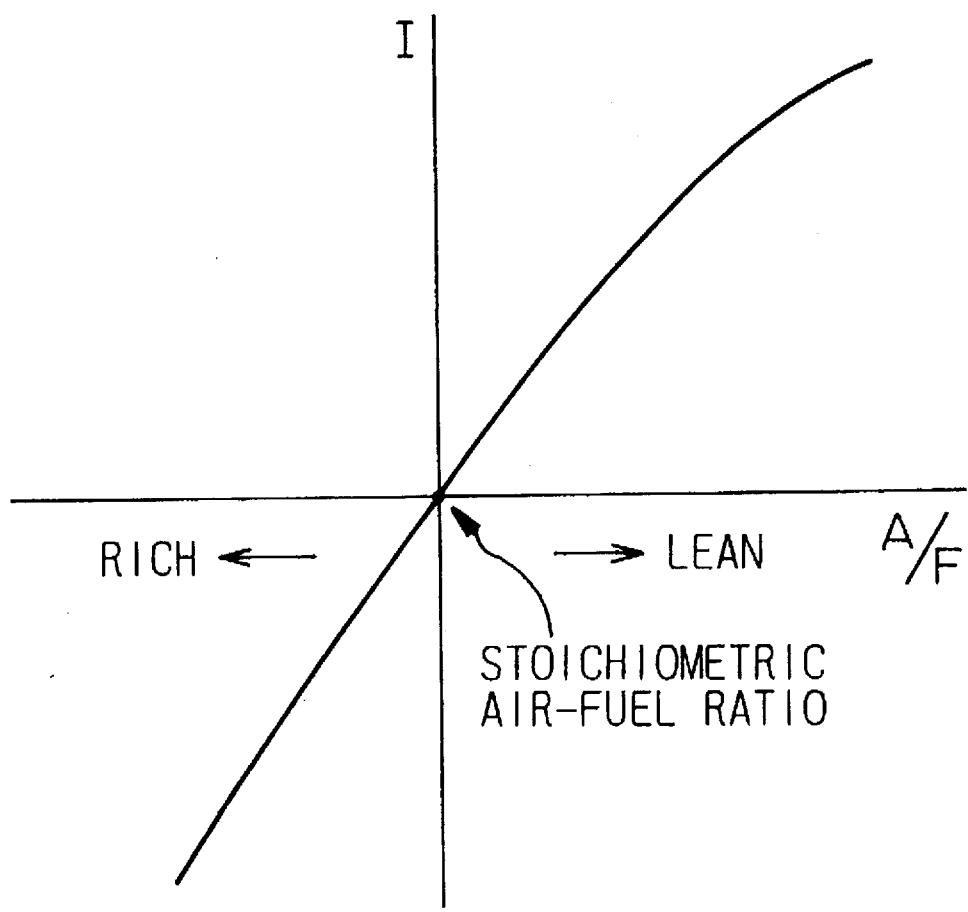
FIG. 2 is a view of the output of an air-fuel ratio sensor.

The three-way catalyst 10 has the function of simultaneously removing the hydrocarbons, carbon monoxide, and $NO_x$ in the exhaust gas when the air-fuel ratio is substantially the stoichiometric air-fuel ratio. Therefore, to simultaneously remove the hydrocarbons, carbon monoxide, and $NO_x$ in the exhaust gas by the three-way catalyst 10, it is necessary to control the air-fuel ratio to substantially the stoichiometric air-fuel ratio. Therefore, in the engine shown in FIG. 1, feedback control is performed so that the air-fuel ratio becomes the stoichiometric air-fuel ratio based on the output signal of the air-fuel ratio sensor 15 arranged in the exhaust manifold 8. That is, the air-fuel ratio sensor 15 generates the current I in accordance with the air-fuel ratio (A/F) as shown in FIG. 2. This current I is converted to voltage and is input through the corresponding AD converter 27 to the input port 25. In the engine shown in FIG. 1, when it is judged based on the output signal of the air-fuel ratio sensor 15 that the air-fuel ratio is lean, the amount of the fuel injected is increased, while when it is judged that the air-fuel ratio is rich, the amount of the fuel injected is decreased. By this, the air-fuel ratio is controlled by feedback to the stoichiometric air-fuel ratio.

In the engine shown in FIG. 1, the air-fuel ratio is normally maintained at the stoichiometric air-fuel ratio by this feedback control, but when the engine is operating at a high load, the air-fuel ratio is made rich, while when it is decelerating, the fuel injection is stopped. That is, when the engine is operating at a high load, the feedback control of the air-fuel ratio is stopped. At this time, the basic amount of the fuel injection, determined by the absolute pressure in the surge tank 3 and the engine speed, is increased exactly by the predetermined ratio to make the air-fuel ratio rich. On the other hand, when the throttle valve 6 is closed and deceleration is started, if the engine speed is more than a predetermined fuel supply stop rate, the injection of the fuel is stopped. When the engine speed then falls below the predetermined fuel feed rate, the fuel injection is restarted.

Next, an explanation will be made of the purification ratio $\psi$ of the exhaust gas by the three-way catalyst 10 referring to FIG. 3. Note that in FIG. 3 the horizontal axis shows the engine operating time, while $\psi_1$, $\psi_2$, $\psi_3$, $\psi_4$, and $\psi_5$ show the purification ratio $\psi$ of the exhaust gas in the case of changing the temperature of the three-way catalyst 10 and the concentration of the oxygen in the exhaust gas. Further, FIG. 3 shows the case of use of a precious metal of which the deterioration progresses when the concentration of oxygen in the exhaust gas increases as the precious metal of the three-way catalyst 10 and oil which does not contain any accumulative type catalyst poison as the oil.

Figure 3:
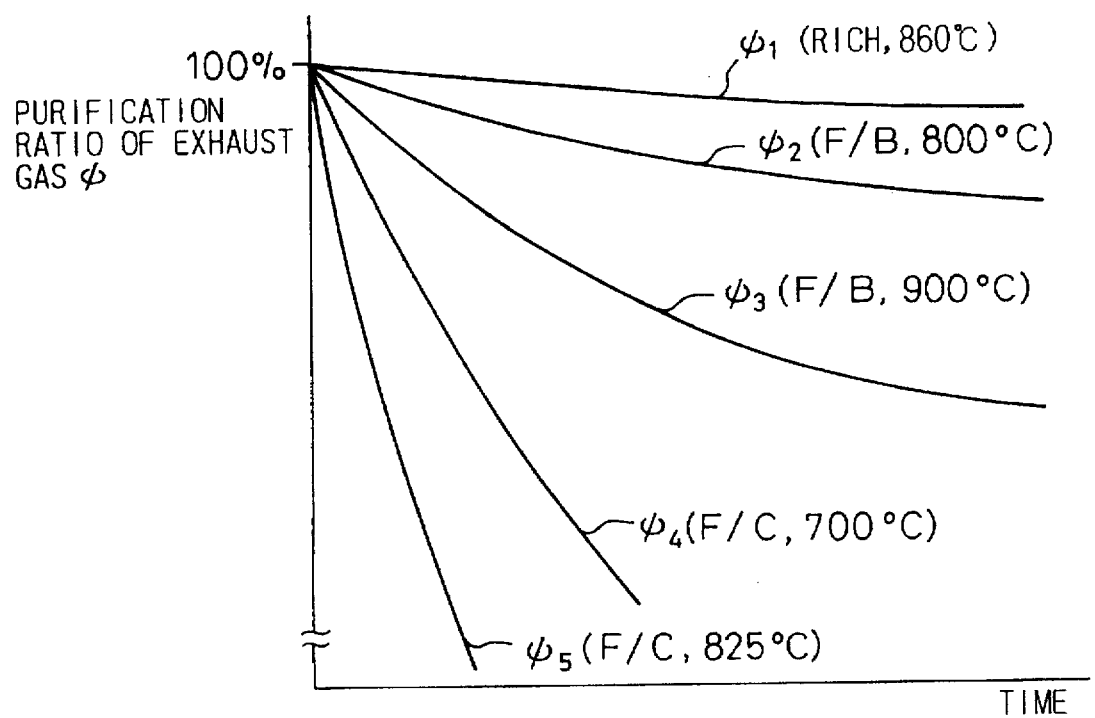
FIG. 3 is a view of the purification ratio $\psi$ of the exhaust gas.

In FIG. 3, the curves $\psi_2$ and $\psi_3$ differ in the temperature of the catalyst but both show the case where the air-fuel ratio is maintained at the stoichiometric air-fuel ratio by feedback control. That is, the curves $\psi_2$ and $\psi_3$ show the case of the same concentration of oxygen in the exhaust gas. Accordingly, the difference between the curves $\psi_2$ and $\psi_3$ is based solely on the difference of temperature of the catalyst. If the temperature of the catalyst is increased from 800° C. to 900° C., it is understood, the degree of deterioration ($\psi_2 \rightarrow \psi_3$) increases. Further, the same can be said of the cases shown by the curves $\psi_4$ and $\psi_5$. That is, the difference between the lines $\psi_4$ and $\psi_5$ is based solely on the difference of temperature of the catalyst. If the temperature of the catalyst bed is increased from 700° C. to 825° C., the degree of deterioration ($\psi_4 \rightarrow \psi_5$) increases.

As shown in FIG. 3, the purification ratios $\psi_1$, $\psi_2$, $\psi_3$, $\psi_4$, and $\psi_5$ of exhaust gas fall as shown by the curves along with the operation time. This will be explained next based on the mechanism of deterioration of the three-way catalyst 10.

The mechanism of deterioration of the three-way catalyst 10 has not been completely elucidated up to now. The present inventors however engaged in repeated research and as a result found that the deterioration of the three-way catalyst 10 is due to the growth of the particle size of the precious metal due to the temperature of the catalyst and the concentration of oxygen. As generally said, the sintering action of the precious metal particles in the catalyst is promoted and the particle size becomes larger as the temperature of the catalyst rises. Similarly, the sintering action of the precious metal particles in the catalyst is promoted and the particle size becomes larger as the concentration of oxygen increases. If the particle size becomes larger, the catalyst gradually deteriorates along with this. This will be explained next based on the findings of experiments shown in FIGS. 4A and 4B. Note that depending on the type of the precious metal, sometimes the sintering action is promoted as the concentration of oxygen becomes lower, but here the explanation will be made taking as an example the case of use of a precious metal of which sintering action is promoted as the concentration of oxygen becomes higher.

Figure 4A:
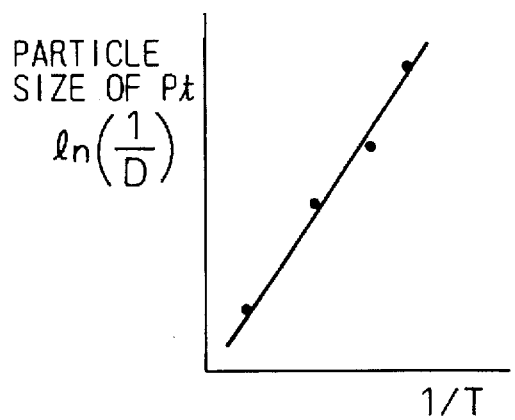
FIGS. 4A and 4B are views for explaining the growth of the particle size of platinum Pt.

FIG. 4A shows the findings of experiments examining the particle size D of the precious metal, that is, the platinum Pt, in the catalyst after maintaining the temperature of the catalyst at the temperature T for a certain period. In other words, FIG. 4A shows the relationship between the amount of growth of the particle size D of the platinum Pt in a certain period, that is, the rate of growth of the particle size dD/dt of the platinum Pt, and the temperature T of the catalyst. From FIG. 4A, the rate of growth of the particle size dD/dt of the platinum Pt is shown by $dD/dt = A_1 \cdot \exp(-B/T)$ (here, $A_1$ and B are constants and T is the absolute temperature of the catalyst) and therefore the rate of growth of the particle size dD/dt of the platinum Pt is expressed in the form of an Arrhenius equation. Therefore, from the findings of the experiments, the rate of growth of the particle size dD/dt of platinum Pt increases exponentially along with the rise of the temperature T of the catalyst.

Figure 4B:
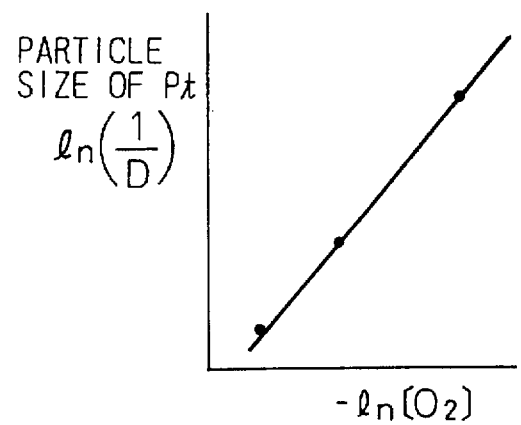

On the other hand, FIG. 4B shows the results of the examination of the particle size D of the platinum Pt in the catalyst after maintaining the concentration of oxygen for a certain period at the concentration $[O_2]$. In other words, FIG. 4B shows the relationship between the amount of growth of the particle size D of the platinum Pt in a certain period, that is, the rate of growth of the particle size dD/dt of the platinum Pt, and the concentration of oxygen $[O_2]$. From FIG. 4B, the rate of growth of the particle size dD/dt of the platinum Pt is expressed by $dD/dt = A_2 \cdot [O_2]^\alpha$ (where $A_2$ and $\alpha$ are constants) and therefore from the results of the experiments the rate of growth of the particle size dD/dt of the platinum Pt increases along with a rise in the concentration of oxygen $[O_2]$.

In this way, the rate of growth dD/dt of the particle size of the platinum Pt corresponding to the concentration of oxygen $[O_2]$ can be expressed in the form of a function of just the concentration of oxygen $[O_2]$, but more specifically the rate of growth of the particle size dD/dt of the platinum Pt is affected by the decrease in the total sum of the surface area of all of the platinum Pt particles. That is, even if each of the platinum Pt particles grows in particle size, the volume of all of the platinum Pt particles in the catalyst remains constant, so when the particle size of the platinum Pt becomes larger, the number of particles of platinum Pt correspondingly decreases. As a result, the total sum of the surface area of all of the platinum Pt particles decreases. Since the growth of the particle size of the platinum Pt due to the oxygen is caused by the surface of the particles of platinum Pt being attacked by oxygen, the smaller the total sum of the surface area of the particles of the platinum Pt, the smaller the total sum of the attack of the oxygen on all of the platinum Pt. If the total sum of the attack force of oxygen on all of platinum Pt particles decreases, the rate of growth of the particle size of platinum Pt declines.

Next, considering the total sum of the surface area of all particles of the platinum Pt, when each of the platinum Pt particles grows in particle size, the surface area of all of the platinum Pt particles increases in proportion to the square of the particle size D. On the other hand, at this time, the volume of each particle of the platinum Pt increases in proportion to the cube of the particle size D, so the number of particles of platinum Pt decreases in inverse proportion to the cube of the particle size D. That is, when each of the platinum Pt particles grows in particle size, the surface area of each particle of the platinum Pt increases in proportion to the square of the particle size D and at this time the number of particles of the platinum Pt falls in inverse proportion to the cube of the particle size D, so the total sum of the surface area of all of the platinum Pt decreases in inverse proportion to the particle size D.

Accordingly, considering the fact that the total sum of the surface area of all particles of the platinum Pt decreases in inverse proportion to the particle size D, the rate of growth of the particle size $dD/dt$ of the platinum Pt when the concentration of oxygen is the concentration $[O_2]$ is expressed by $dD/dt = A_3 \cdot (1/D) \cdot [O_2]^\alpha$. Here, $A_3$ is a constant.

Accordingly, the rate of growth of the particle size $dD/dt$ of the platinum Pt in the catalyst after maintaining the temperature of the catalyst at the temperature T for a certain time and maintaining the concentration of oxygen for a certain time at the concentration $[O_2]$ is given by the product of $A_1 \cdot \exp(-B/T)$ and $A_3 \cdot (1/D) \cdot [O_2]^\alpha$, that is, the following equation:

$$dD/dt = A \cdot (1/D) \cdot \exp(-B/T) \cdot [O_2]^\alpha$$

Here, A $(=A_1 \cdot A_3)$ is a constant. Next, when the $(1/D)$ on the right side is moved to the left side, the above equation becomes as follows:

$$D \cdot dD/dt = A \cdot \exp(-B/T) \cdot [O_2]^\alpha$$

$$\tfrac{1}{2} \cdot dD^2/dt = A \cdot \exp(-B/T) \cdot [O_2]^\alpha$$

Next, if the above equation is integrated by the time t, the following equation results:

$$D^2 = 2A \cdot \exp(-B/T) \cdot [O_2]^\alpha \cdot t$$
$$D = (2A)^{1/2 + \epsilon \cdot \mathrm{fra}} \cdot \exp(-B/2T) \cdot [O_2]^{\alpha/2} \cdot t^{1/2}$$

Here, if $(2A)^{+\epsilon \cdot \mathrm{fra}\ 1/2}$ is replaced by A, B/2 is replaced by B, and $\alpha/2$ is replaced by $\alpha$, the above equation becomes as follows:

$$D = A \cdot \exp(-B/T) \cdot [O_2]^\alpha \cdot t^{1/2}$$

Here, t shows the operating time of the engine. Therefore, the particle size D of the platinum Pt in the catalyst, as shown by the above equation, is proportional to the (½) power of the operating time. This is because, it is assumed that the total sum of the surface area of the platinum Pt decreases in inverse proportion to the particle size D along with time as mentioned earlier. However, the surface area of the platinum Pt in fact decreases due to complicated processes and therefore the total sum of the surface area of the platinum Pt does not necessarily decrease accurately in inverse proportion to the particle size D. When the total sum of the surface area of the platinum Pt does not decrease accurately in inverse proportion to the particle size D in this way, it is confirmed that the particle size D is proportional to the m power (m being a positive number of less than 1.0) of the operating time. Therefore, the general equation showing the particle size D of the platinum Pt becomes as follows:

$$D = A \cdot \exp(-B/T) \cdot [O_2]^\alpha \cdot t^m$$

As shown by this general equation, the particle size of the platinum Pt becomes a function of the temperature T of the catalyst, the concentration of oxygen $[O_2]$, and the operating time t. Here, if the platinum Pt grows in particle size, the catalytic performance deteriorates, so the purification ratio $\psi$ of the exhaust gas declines, but in this case it was learned from experimental findings that the degree of decrease of the purification ratio $\psi$ of the exhaust gas is accurately proportional to the rate of growth of the particle size of the platinum Pt. That is, if the initial particle size of the platinum Pt is $D_0$ and the initial purification ratio of the exhaust gas is $\psi_0$, it was learned that the following relationship stands:

$$(\psi_0 - \psi)/\psi_0 = D/D_0$$

Rewriting the above equation, the purification ratio $\psi$ of the exhaust gas becomes as follows:

$$\psi = \psi_0 - (\psi_0/D_0) \cdot A \cdot \exp(-B/T) \cdot [O_2]^\alpha \cdot t^m$$

Here, if $(\psi_0/D_0) \cdot A$ is replaced by A, the above equation becomes as follows:

$$\psi = \psi_0 - A \cdot \exp(-B/T) \cdot [O_2]^\alpha \cdot t^m$$

FIG. 3 shows the relationship between the purification ratio $\psi$ of the exhaust gas and the operating time t when changing the temperature T of the catalyst and the concentration of the oxygen $[O_2]$ in the above equation in various ways. As shown in FIG. 3, the degree of decrease of the purification ratio $\psi$ of the exhaust gas gradually becomes smaller along with the operating time t.

In this way, strictly speaking, the purification ratio $\psi$ of the exhaust gas changes as shown in FIG. 3, but in practice it is possible to use an approximation which deems the rate of growth of particle size of the platinum Pt to be constant regardless of the operating time t. In this approximation, m is regarded as being equal to 1 in the above equation showing the purification ratio $\psi$ of the exhaust gas, so the purification ratio $\psi$ of the exhaust gas can be expressed as follows:

$$\psi = \psi_0 - A \cdot \exp(-B/T) \cdot [O_2]^\alpha \cdot t$$

Figure 5:
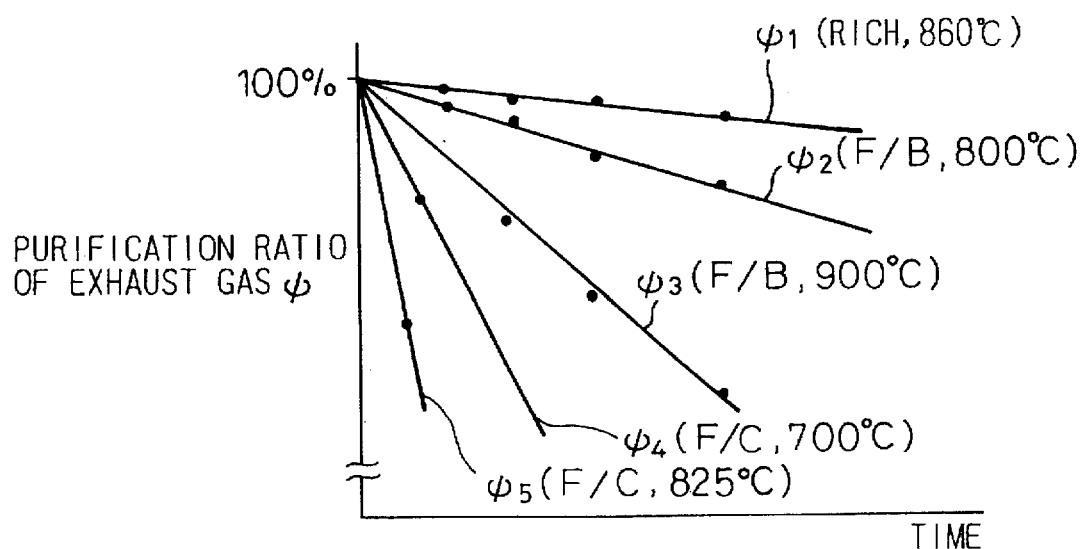
FIG. 5 is a view of the purification ratio $\psi$ of the exhaust gas.

As understood from the above equation, if this approximation is used, the purification ratio $\psi$ of the exhaust gas can be understood to decline linearly along with the operating time. Note that in this approximation the constants A, B, and $\alpha$ are found by experiments. In FIG. 5, the black dots show the values measured when changing the temperature of the three-way catalyst 10 and the concentration of oxygen in the exhaust gas. The lines $\psi_1$, $\psi_2$, $\psi_3$, $\psi_4$, and $\psi_5$ in FIG. 5 show the purification ratios of the exhaust gas calculated from the above approximations using the constants A, B, and $\alpha$ obtained from these measured values. As will be understood from FIG. 5, the lines $\psi_1$, $\psi_2$, $\psi_3$, $\psi_4$, and $\psi_5$ obtained from the above approximation substantially match the measurement values of the corresponding catalyst temperatures and concentrations of oxygen and therefore the above approximation appropriately shows the changes in the purification ratio $\psi$ of the exhaust gas.

Note that in FIG. 5, the operating conditions corresponding to the lines $\psi_1$, $\psi_2$, $\psi_3$, $\psi_4$, and $\psi_5$ (rich, 860°, etc.) are the same as the operating conditions for the corresponding lines $\psi_1 1$, $\psi_2$, $\psi_3$, $\psi_4$, and $\psi_5$ in FIG. 3. That is, in FIG. 5, $\psi_1$ shows the case of operating the engine in a steady state where the temperature of the catalyst is maintained at 860° C. and the air-fuel ratio is made rich, $\psi_2$ shows the case of operating the engine in a steady state where the temperature of the catalyst is maintained at 800° C. and feedback control is used to maintain the air-fuel ratio at the stoichiometric air-fuel ratio, $\psi_3$ shows the case of operating the engine in a steady state where the temperature of the catalyst is maintained at 900° C. and feedback control is used to maintain the air-fuel ratio at the stoichiometric air-fuel ratio, $\psi_4$ shows the case of operating the engine in a steady state where the temperature of the catalyst is maintained at 700° C. and the injection of fuel is stopped, and $\psi_5$ shows the case of operating the engine in a steady state where the temperature of the catalyst is maintained at 825° C. and the injection of fuel is stopped. Further, FIG. 5, like in the case shown in FIG. 3, shows the case where a precious metal which deteriorates more when the concentration of oxygen in the exhaust gas is higher is used as the precious metal of the three-way catalyst 10.

When the rate of growth of the size of the platinum Pt is deemed to be constant regardless of the operating time t, as shown in FIG. 5, $\psi_1$, $\psi_2$, $\psi_3$, $\psi_4$, and $\psi_5$ are expressed by straight lines. In this case, the inclination of the lines $\psi_1$, $\psi_2$, $\psi_3$, $\psi_4$, and $\psi_5$ shows the rate of decline of the purification ratio $\psi$ of the exhaust gas. Note that FIG. 5 shows the case where fuel and oil not containing accumulative type catalyst poison is used. Accordingly, the rate of decline of the purification ratio $\psi$ of the exhaust gas shows the rate of deterioration of the three-way catalyst 10. Therefore, the inclination ($-d\psi/dt$) of the lines $\psi_1$, $\psi_2$, $\psi_3$, $\psi_4$, and $\psi_5$ in FIG. 5 is referred to as the rate of deterioration K.

Note that by differentiating the above approximation ($\psi=\psi_0 - A \cdot \exp(-B/T) \cdot [O_2]^\alpha \cdot t$) by time to find the inclination ($-d\psi/dt$) of the lines $\psi_1$, $\psi_2$, $\psi_2$, $\psi_3$, $\psi_4$, and $\psi_5$, the following equation is obtained:

$$-d\psi/dt = A \cdot \exp(-B/T) \cdot [O_2]^\alpha$$

Therefore, the rate of deterioration K becomes a function of the temperature T of the catalyst and the concentration of oxygen $[O_2]$ as shown by the following equation:

$$K = -d\psi/dt = A \cdot \exp(-B/T) \cdot [O_2]^\alpha$$

Here, if the constants A and B are shown by $C_1$ and $C_2$, respectively, and the logarithm of the two sides is taken, the rate of deterioration K can be expressed by the following equation of the rate of deterioration:

$$\ln K = C_1 - C_2 \cdot (1/T) + \alpha \ln [O_2]$$

In FIG. 5, the lines $\psi_2$ and $\psi_3$ show the cases where the air-fuel ratio is maintained at the stoichiometric air-fuel ratio by feedback control though the temperatures of the catalysts differ. That is, the lines $\psi_2$ and $\psi_3$ show the cases of the same concentration of oxygen in the exhaust gas. Accordingly, the difference between the lines $\psi_2$ and $\psi_3$ is based solely on the difference of temperature of the catalyst. If the temperature of the catalyst is increased from 800° C. to 900° C. ($\psi_2 \rightarrow \psi_3$), it is understood, the rate of deterioration K increases. Further, the same can be said of the cases shown by the lines $\psi_4$ and $\psi_5$. That is, the difference between the lines $\psi_4$ and $\psi_5$ is based solely on the difference of temperature of the catalyst. If the temperature of the catalyst is increased from 700° C. to 825° C. ($\psi_4 \rightarrow \psi_5$), it is understood, the rate of deterioration K increases and therefore the deterioration of the three-way catalyst 10 advances rapidly.

Next, consider the case where the temperature of the catalyst is maintained at a certain temperature, for example, at 800° C. and the concentration of oxygen in the exhaust gas is changed, that is, the air-fuel ratio is made rich or the stoichiometric air-fuel ratio or the injection of fuel is stopped. FIG. 5 does not show the case where the temperature of the catalyst is 800° C. and the air-fuel ratio is rich, but the line showing this state becomes a line with a smaller inclination than even the line $\psi_1$. Similarly, FIG. 5 does not show the case where the temperature of the catalyst is 800° C. and the injection of fuel is stopped, but the line showing this state is between the lines $\psi_4$ and $\psi_5$. Therefore, if the temperature of the catalyst is maintained at a certain temperature and the operating state of the engine is changed from the rich air-fuel ratio state through the stoichiometric air-fuel ratio state to the state where the fuel injection is stopped, that is, if the concentration of oxygen in the exhaust gas is increased, it is learned, the rate of deterioration K gradually increases.

Note that as mentioned above, FIG. 5 shows the case where a precious metal which increasingly deteriorates as the concentration of oxygen in the exhaust gas rises is used as the precious metal of the three-way catalyst 10. In this case, the above-mentioned constant $\alpha$ becomes a positive value. As opposed to this, when a precious metal which increasingly deteriorates when the concentration of oxygen in the exhaust gas becomes lower is used as the precious metal of the three-way catalyst 10, the constant $\alpha$ becomes a negative value.

Figure 6A:
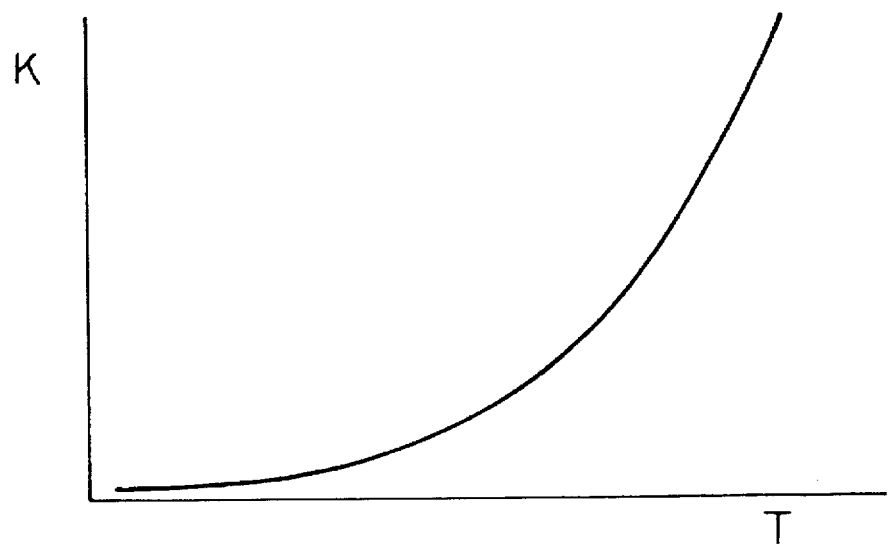
FIGS. 6A and 6B are views of the rate of deterioration K.
Figure 6B:
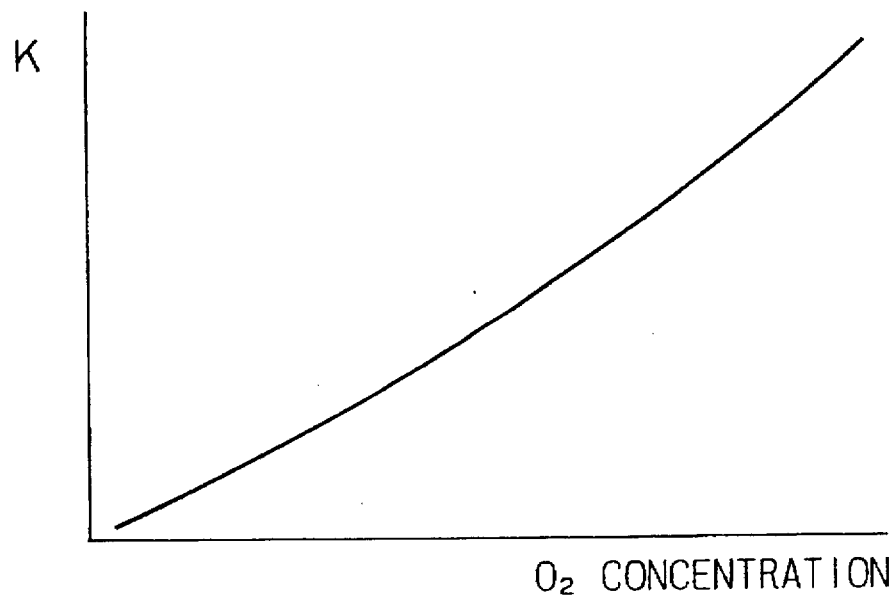

FIG. 6A shows the relationship between the rate of deterioration K calculated based on the equation of the deterioration rate and the temperature T of the catalyst. FIG. 6B shows the relationship between the rate of deterioration K calculated based on the equation of the deterioration rate and the concentration of oxygen $[O_2]$ in the exhaust gas. As shown in FIG. 6A, when the temperature T of the catalyst rises, the rate of deterioration K increases exponentially.

Next, an explanation will be given of the specific method of evaluating the deterioration of the three-way catalyst 10 using the above equation of the deterioration rate. When the operating state of the engine changes, the rate of deterioration K changes along with it, so it is necessary to successively find the degree of catalyst performance deterioration in a predetermined period, in this embodiment of the present invention, the degree of catalyst performance deterioration in a certain time $\Delta t$, accumulate the degree of catalyst performance deterioration, and evaluate the deterioration of the three-way catalyst from the accumulated value.

Here, the degree of catalyst performance deterioration in a certain period $\Delta t$ is obtained by multiplying the certain period $\Delta t$ by a typical rate of deterioration K in the certain period $\Delta t$. Accordingly, in this embodiment of the present invention, the successively calculated $K \cdot \Delta t$ are accumulated and it is judged that the three-way catalyst 10 has deteriorated when the accumulated value of the $K \cdot \Delta t$ exceeds a certain value.

Next, an explanation will be made of the method of finding the rate of deterioration K. As explained above, the rate of deterioration K is a function of the temperature T of the catalyst and the concentration of oxygen $[O_2]$ in the exhaust gas. To find the rate of deterioration K, it is necessary to detect the temperature T of the catalyst and the concentration of oxygen $[O_2]$. In this embodiment of the present invention, the temperature T of the catalyst is detected by the temperature sensor 16 and the concentration of oxygen $[O_2]$ by the air-fuel ratio sensor 15.

Figure 7:
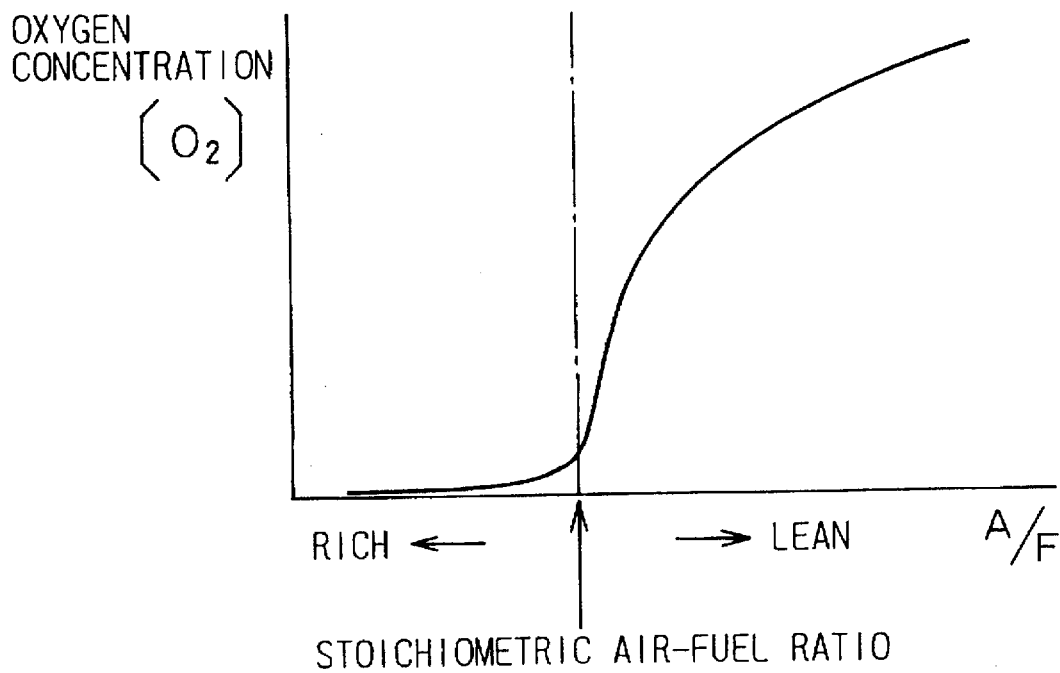
FIG. 7 is a view of the concentration of oxygen [$O_2$]
Figure 8:
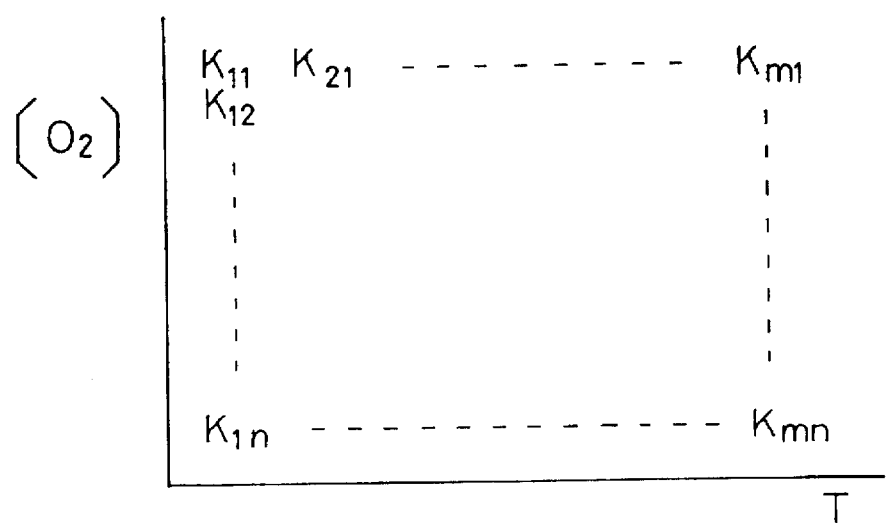
FIG. 8 is a view of a map of the rate of deterioration K.

That is, it is known that the temperature of the exhaust gas flowing from the three-way catalyst 10 is lower than the temperature of the catalyst by a certain temperature. By adding this certain temperature to the temperature of the exhaust gas detected by the temperature sensor 16, the temperature T of the catalyst is found. Further, the concentration of oxygen $[O_2]$ in the exhaust gas becomes a function of the air-fuel ratio A/F as shown in FIG. 7. Therefore, the concentration of oxygen $[O_2]$ is calculated from the function shown in FIG. 7 based on the air-fuel ratio A/F detected by the air-fuel ratio sensor 15. Note that the rate of deterioration K can be found from the equation of the deterioration rate, so in the embodiment of the present invention, as shown in FIG. 8, the rate of deterioration K is stored in advance in a map in the form of a function of the temperature T of the catalyst and the concentration of oxygen $[O_2]$. The rate of deterioration K is found from this map.

Figure 9:
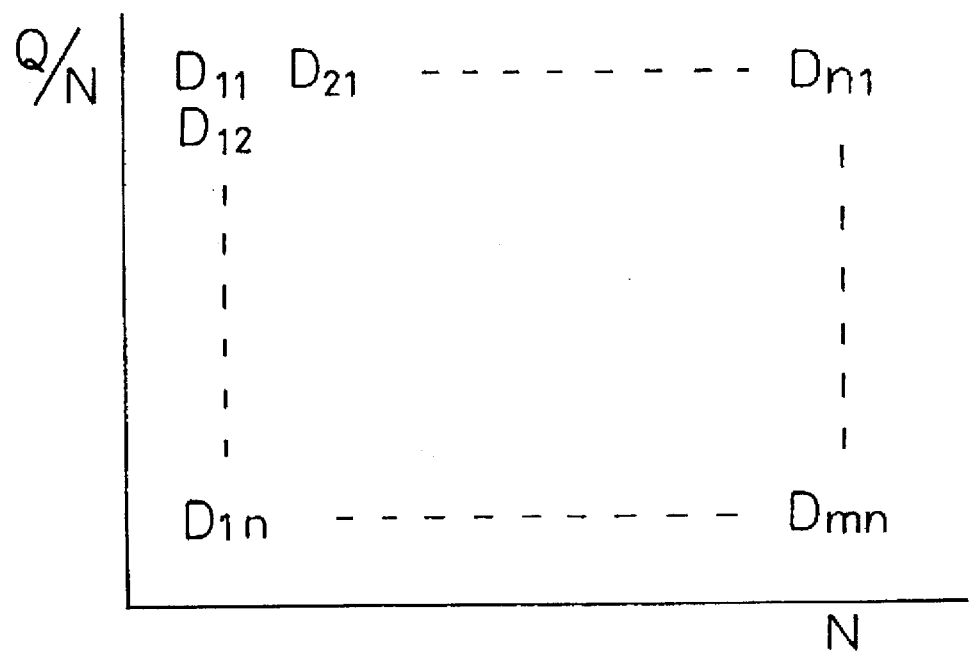
FIG. 9 is a view of a map of the degree of catalyst performance deterioration D due to poisoning per unit time.

Further, this embodiment of the present invention shows the case of use of oil containing accumulative type catalyst poison. The amount of the catalyst poison in the oil is substantially constant. Further, the amount of the oil leaking to the inside of the combustion chamber is determined by the operating state of the engine. Accordingly, the amount of the catalyst poison leaking inside the combustion chamber, that is, the degree of deterioration of the three-way catalyst 10 by the poisoning, is determined by the operating state of the engine. Therefore, in the embodiment of the present invention, the degree of catalyst performance deterioration D of the three-way catalyst 10 due to the poisoning per unit time is stored in advance in the ROM 22 in the form of a function of the engine load Q/N (amount of intake air Q/engine speed N) and the engine speed N as shown in FIG. 9.

Figure 10:
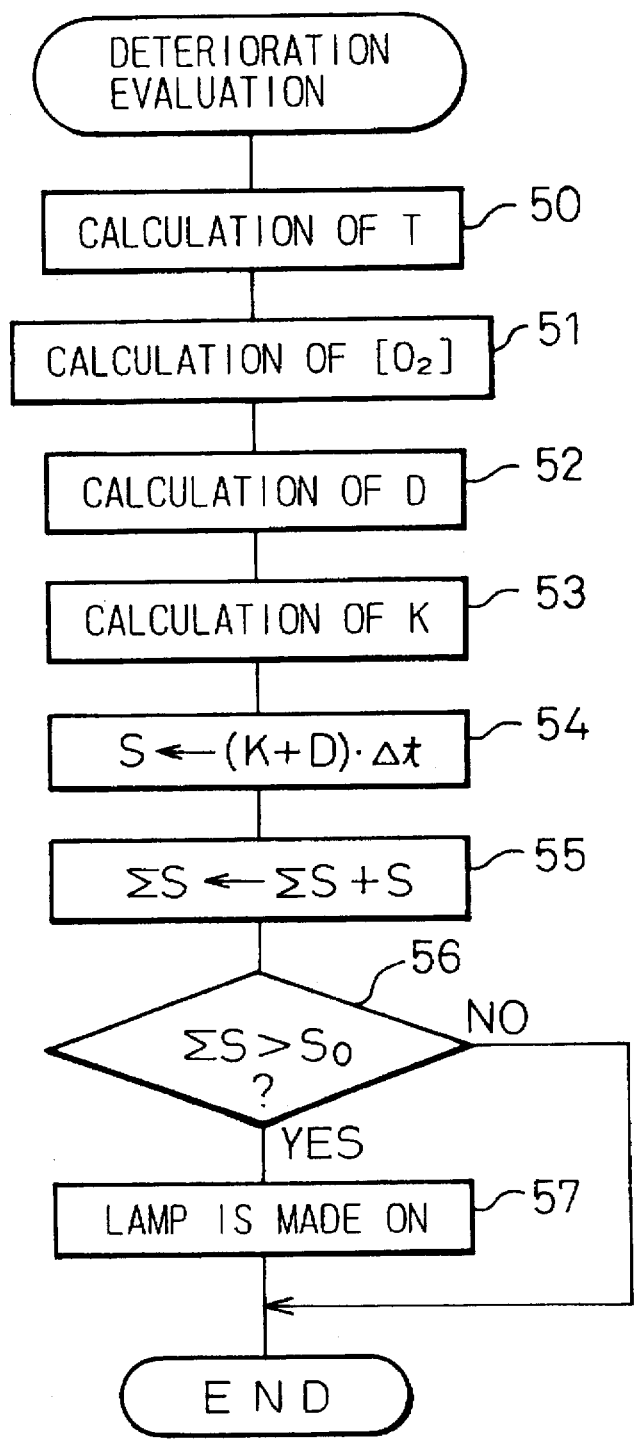
FIG. 10 is a flow chart of the evaluation of the deterioration.

FIG. 10 shows the routine for evaluation of deterioration of the three-way catalyst 10. This routine is executed by interruption at a predetermined time interval.

Referring to FIG. 10, first, in step 50, the temperature T of the catalyst is calculated from an output signal of the temperature sensor 16. Next, in step 51, the concentration of oxygen $[O_2]$ is calculated from an output signal of the air-fuel ratio sensor 15. Next, in step 52, the degree of catalyst performance deterioration D due to poisoning per unit time is calculated from the map shown in FIG. 9. Next, in step 53, the rate of deterioration K is calculated from the map shown in FIG. 8 based on the temperature T of the catalyst and the concentration of oxygen $[O_2]$. Next, in step 54, the time interval $\Delta t$ of interruptions is multiplied by the total sum of the rate of deterioration K and the degree of catalyst performance deterioration D to calculate the degree of catalyst performance deterioration S in the interruption time intervals. Next, in step 55, the degree of catalyst performance deterioration S is accumulated, then in step 56 it is judged if the accumulated value $\Sigma S$ of the degree of catalyst performance deterioration S exceeds a predetermined certain value $S_0$. When $\Sigma S > S_0$, it is judged that the three-way catalyst 10 has deteriorated and the routine proceeds to step 57, where the alarm lamp 18 is lit.

Next, an explanation will be made of the method of evaluating the deterioration of the three-way catalyst 10 based on the strictly found purification ratio $\psi$ of the exhaust gas.

As explained above, the strictly found purification ratio $\psi$ of the exhaust gas is given by the following equation:

$$\psi = \psi_0 - A \cdot \exp(-B/T) \cdot [O_2]^\alpha \cdot t^m$$

Figure 11:
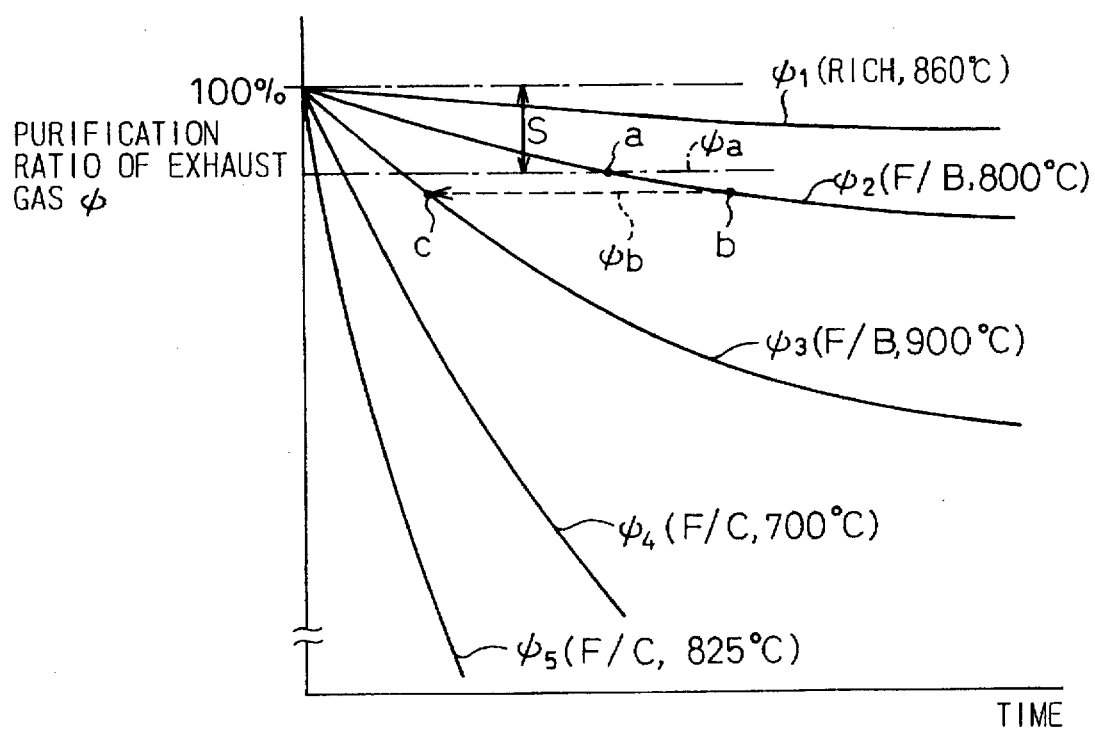
FIG. 11 is a view of the purification ratio $\psi$ of the exhaust gas.

Here, the constants A, B, $\alpha$, and m are found from experimental values. The curves $\psi_1$, $\psi_2$, $\psi_3$, $\psi_4$, and $\psi_5$ shown in FIG. 11 show the purification ratios of the exhaust gas calculated based on the above equation. Note that the curves $\psi_1$, $\psi_2$, $\psi_3$, $\psi_4$, and $\psi_5$ shown in FIG. 11 respectively correspond to the curves $\psi_1$, $\psi_2$, $\psi_3$, $\psi_4$, and $\psi_5$ shown in FIG. 3.

Focusing on any one of the curves in FIG. 11, for example, the curve $\psi_2$, the inclination $(-d\psi_2/dt)$ of the curve $\psi_2$ gradually becomes smaller along with the operating time. Therefore, the rate of deterioration K, which is expressed by this inclination $(-d\psi_2/dt)$ also becomes smaller along with the operating time. In other words, the rate of deterioration K becomes smaller as the purification ratio $\psi$ of the exhaust gas becomes lower. Accordingly, when evaluating the deterioration of the three-way catalyst 10 based on the strictly found purification ratio $\psi$ of the exhaust gas, the rate of deterioration K becomes a function of the temperature T of the catalyst, the concentration of oxygen $[O_2]$ in the exhaust gas, and the operating time or the purification ratio $\psi$ of the exhaust gas.

Figure 12:
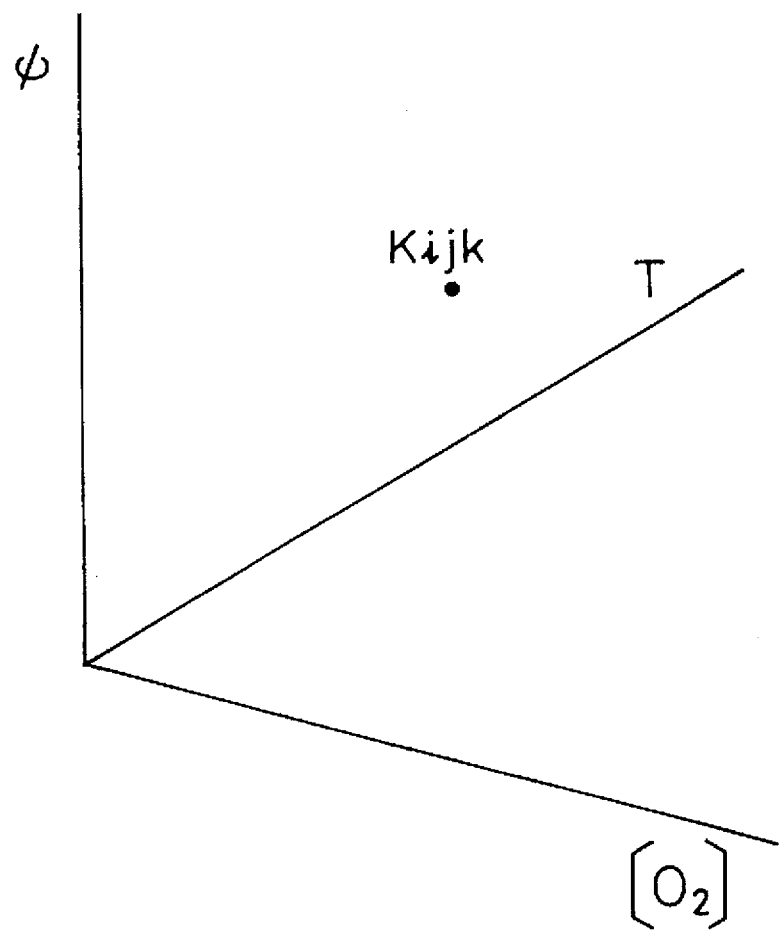
FIG. 12 is a view of a three-dimensional map of the rate of deterioration K.

In the embodiment of the present invention, the rate of deterioration Kijk is stored in advance in the ROM 22 in the form of a three-dimensional map as shown in FIG. 12 as a function of the temperature T of the catalyst, the concentration of oxygen $[O_2]$ in the exhaust gas, and the purification ratio $\psi$ of the exhaust gas. Now when assuming that the purification ratio $\psi$ of the exhaust gas is $\psi_a$, feedback control is performed, and the temperature T of the catalyst is 800° C., the rate of deterioration K at this time is expressed by the inclination $(-d\psi_2/dt)$ of the curve $\psi_2$ at the point a. The degree of catalyst performance deterioration in a certain period $\Delta t$ at this time is obtained by multiplying the rate of deterioration K at the point a by the certain period $\Delta t$.

On the other hand, assume the current state is at the point b on the curve $\psi_2$ and becomes the state shown by the curve $\psi_3$ from this state. At this time, the deterioration of the three-way catalyst 10 proceeds from the point c on the curve $\psi_3$ of the same purification ratio as the purification ratio $\psi_b$ of the exhaust gas at the point b, so the degree of catalyst performance deterioration in the certain period $\Delta t$ at this time is obtained by multiplying the rate of deterioration K at the point c by the certain period $\Delta t$. The rates of deterioration K at the points a, b, and c are calculated from the three-dimensional map shown in FIG. 12.

Figure 13:
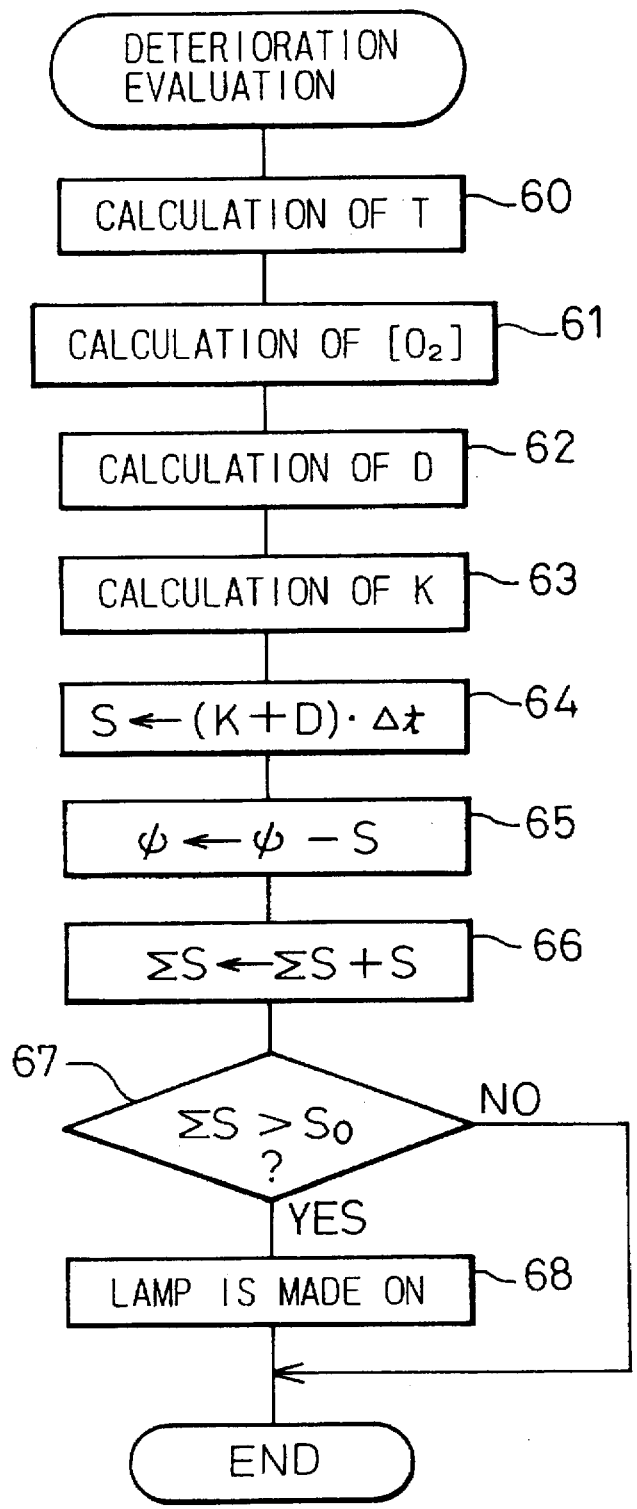
FIG. 13 is a flow chart of the evaluation of deterioration.

FIG. 13 shows the routine for evaluation of the deterioration of the three-way catalyst 10. The routine is executed by interruption at a predetermined time interval.

Referring to FIG. 13, first, in step 60, the temperature T of the catalyst is calculated from an output signal of the temperature sensor 16. Next, in step 61, the concentration of oxygen $[O_2]$ is calculated from an output signal of the air-fuel ratio sensor 15. Next, in step 62, the degree of catalyst performance deterioration D due to poisoning per unit time is calculated from the map shown in FIG. 9. Next, in step 63, the rate of deterioration K is calculated from the three-dimensional map shown in FIG. 12 based on the temperature T of the catalyst, the concentration of oxygen $[O_2]$, and the current purification ratio $\psi$ of the exhaust gas. Next, in step 64, the time interval $\Delta t$ of the interruptions is multiplied by the rate of deterioration K and the degree of catalyst performance deterioration D to calculate the degree of catalyst performance deterioration S in the interruption time intervals. Next, in step 65, the degree of catalyst performance deterioration S is subtracted from the purification ratio $\psi$ of the exhaust gas. Next, in step 66, the degree of catalyst performance deterioration S is accumulated, then in step 67, it is judged if the accumulated value $\Sigma S$ of the degree of catalyst performance deterioration S exceeds a predetermined value $S_0$ or not. When $\Sigma S > S_0$, it is judged that the three-way catalyst 10 has deteriorated and the routine proceeds to step 68 where the alarm lamp 18 is lit.

Next, an explanation will be made of the method of finding the purification ratio $\psi$ of the exhaust gas by a completely different approach using probability and evaluating the deterioration of the three-way catalyst 10 based on the purification ratio $\psi$ of the exhaust gas obtained.

That is, as explained above, the particle size of each of the platinum Pt particle in the catalyst gradually becomes larger along with the operating time. If the particle size of the platinum Pt becomes larger, the number of particles of the platinum Pt decreases and as a result the sum of the surface area of the platinum Pt gradually decreases and therefore the purification ratio $\psi$ of the exhaust gas gradually declines. In this case, the gradual decrease of the sum of the surface area of the platinum Pt may be considered equivalent to a gradual increase of the rate of failure of the elements providing a catalytic performance. Therefore, it becomes possible to find the purification ratio $\psi$ of the exhaust gas from the failure rate of the elements providing the catalytic performance.

It is known that the rate of failure can be found from the following Weibull distribution function:

$$R(t)=1-F(t)=\exp(-t^m/t_0)$$

Here, F(t) shows the failure rate, therefore, R(t) shows the probability of no failure occurring. Further, t shows the elapsed time, m a variable, and $t_0$ a constant. When applying this Weibull function to the calculation of the purification ratio $\psi$ of the exhaust gas, the probability R(t) where no failure occurs corresponds to the purification ratio $\psi$ of the exhaust gas and t corresponds to the operating time. Accordingly, if the Weibull distribution function is used, the purification ratio $\psi$ of the exhaust gas is shown by the following equation:

$$\psi=\exp(-t^m/t_0)$$

Here, if the logarithm of the above equation is taken, the following results:

$$\ln(1/\psi)=t^m/t_0$$

Here, if the constant $t_0$ is replaced by (1/C), the above equation becomes as follows:

$$\ln(1/\psi)=C \cdot t^m$$

On the other hand, if the left side of the above equation is developed by the Taylor method and items of the second and later order are ignored, the left side of the above equation can be rewritten as follows:

$$\ln(1/\psi)=1-\psi$$

That is, $\ln(1/\psi)$ shows the degree of decrease of the purification ratio $\psi$ of the exhaust gas.

On the other hand, as explained above, the strictly found purification ratio $\psi$ of the exhaust gas is expressed by the following equation:

$$\psi=\psi_0-A\cdot\exp(-B/T)\cdot[O_2]^\alpha\cdot t^n$$

As opposed to this, the purification ratio $\psi$ of the exhaust gas found using the Weibull distribution function is expressed in the following way:

$$\psi=\psi_0-C\cdot t^m$$

(where, 1 is replaced by $\psi_0$)

As will be understood by comparing these two equations, the two equations considerably resemble each other in form.

Figure 14:
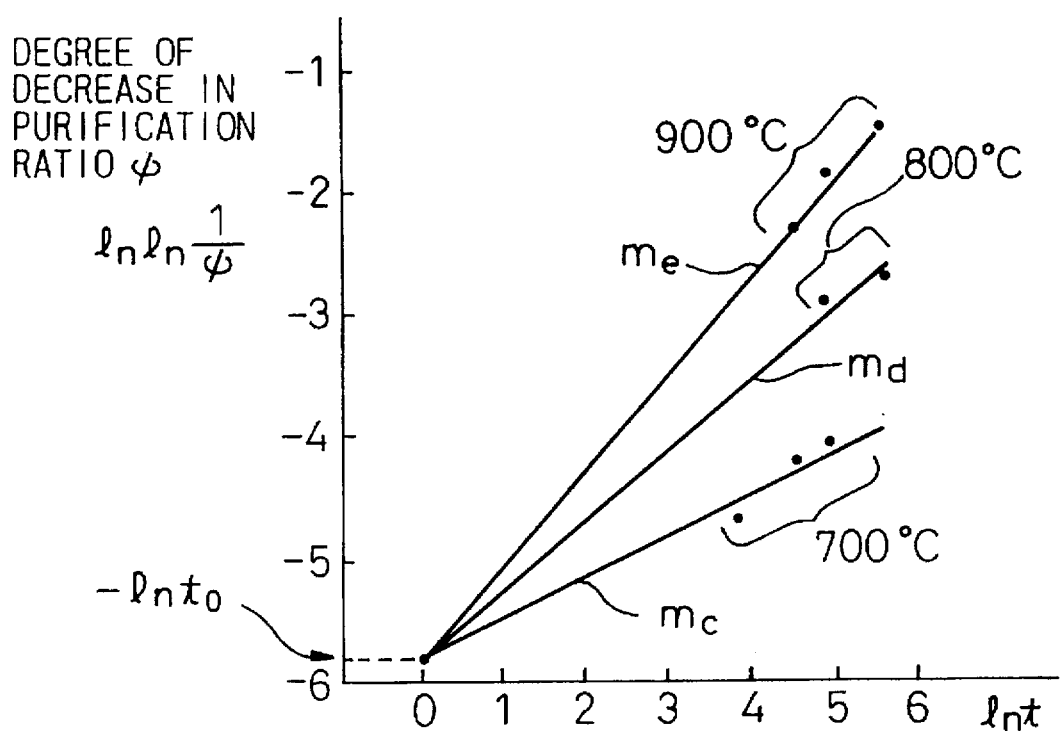
FIG. 14 is a view of the degree of decrease $\ln\ln(1/\psi)$ of the purification ratio $\psi$.

Next, an explanation will given of the purification ratio $\psi$ of exhaust gas obtained by the Weibull distribution function and the findings of the experiment while referring to FIG. 14. If the logarithm of the two sides of the equation $\psi=\exp(-t^m/t_0)$ showing the purification ratio of the exhaust gas is taken twice, the following equation results:

$$\ln\ln(1/\psi)=m\cdot\ln t-\ln t_0$$

The vertical axis $\ln\ln(1/\psi)$ of FIG. 14 shows the left side of the above equation. Accordingly, the vertical axis $\ln\ln(1/\psi)$ of FIG. 14 shows the degree of decrease of the purification ratio $\psi$ of the exhaust gas. The horizontal axis $\ln t$ of FIG. 14 shows the operating time. Further, in FIG. 14, the black dots show the values measured when the air-fuel ratio is controlled to the stoichiometric air-fuel ratio by feedback while maintaining the temperature T of the three-way catalyst 10 at 700° C., 800° C., and 900° C., respectively. As shown in FIG. 14, the experimental values are substantially positioned on the lines obtained by changing only the values of m showing the inclination in the above equation. Accordingly, it is found possible to calculate the purification ratio $\psi$ of the exhaust gas using the Weibull distribution function. Note that as will be understood from FIG. 14, the value of m showing the inclination in the above equation becomes a function of the temperature T of the catalyst. As understood from $m_c$, $m_d$, and $m_e$, the value of m becomes larger the higher the temperature T of the catalyst.

On the other hand, as mentioned above, the purification ratio $\psi$ of the exhaust gas can be expressed by the following equation:

$$\ln(1/\psi)=C \cdot t^m$$

(C is a constant)

Figure 15:
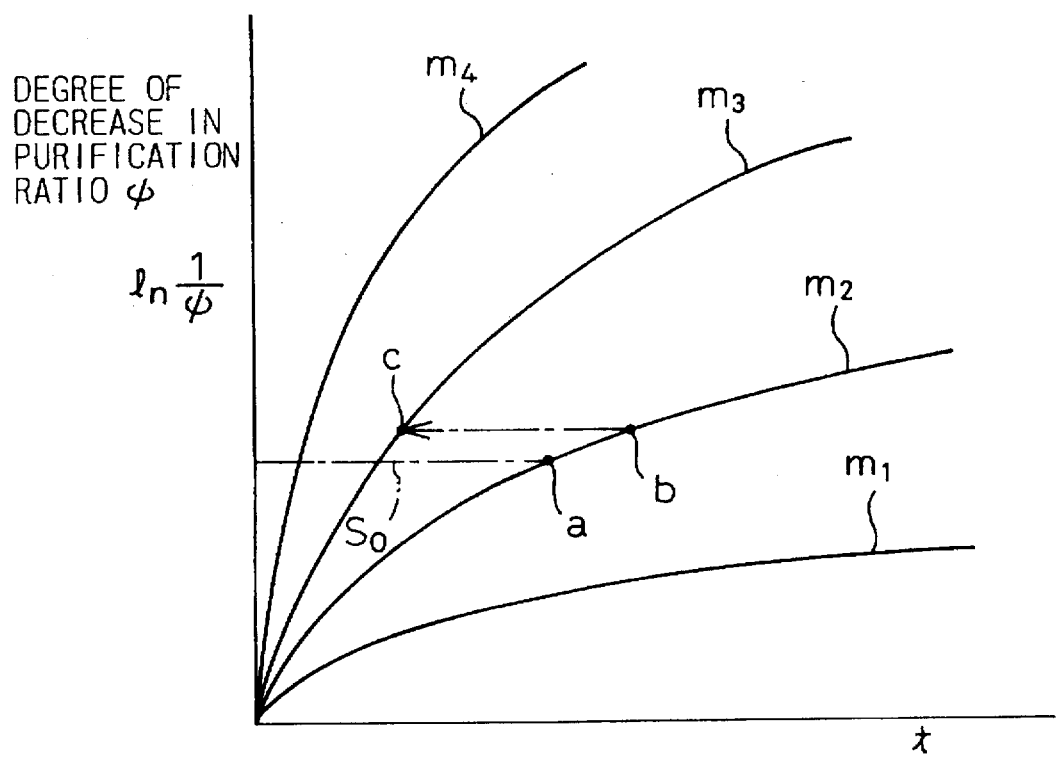
FIG. 15 is a view of the degree of decrease $\ln(1/\psi)$ of the purification ratio $\psi$.

The vertical axis $\ln(1/\psi)$ of FIG. 15 shows the left side of the above equation. The horizontal axis t of FIG. 15 shows the operating time. The curves show curves of different values of m. The values of m are found from the experimental values shown in FIG. 14. Note that all of the curves show the change in the degree of decrease $\ln(1/\psi)$ of the purification ratio $\psi$ at the time of operation when the air-fuel ratio is controlled to the stoichiometric air-fuel ratio by feedback. The temperature T of the catalyst during feedback control becomes higher the larger the value of m, that is, in the order of $m_1$, $m_2$, $m_3$, and $m_4$.

The curves $m_1$, $m_2$, $m_3$, and $m_4$ shown in FIG. 15 show the relationship between the operating time t and the degree of decrease of the purification ratio $\psi$ of the exhaust gas. Accordingly, the inclination of the curves $m_1$, $m_2$, $m_3$, and $m_4$ show the rate of deterioration K. As understood from FIG. 15, the rate of deterioration K becomes larger the higher the temperature T of the catalyst and becomes smaller the longer the operating time t. Note that the curves $m_1$, $m_2$, $m_3$, and $m_4$ shown in FIG. 15 are values when the air-fuel ratio is controlled by feedback to the stoichiometric air-fuel ratio, that is, values when the concentration of oxygen $[O_2]$ in the exhaust gas is maintained substantially constant. Accordingly, in this case, the rate of deterioration K becomes a function of the temperature T of the catalyst and the degree of decrease $\ln(1/\psi)$ of the purification ratio $\psi$ of the exhaust gas.

Figure 16:
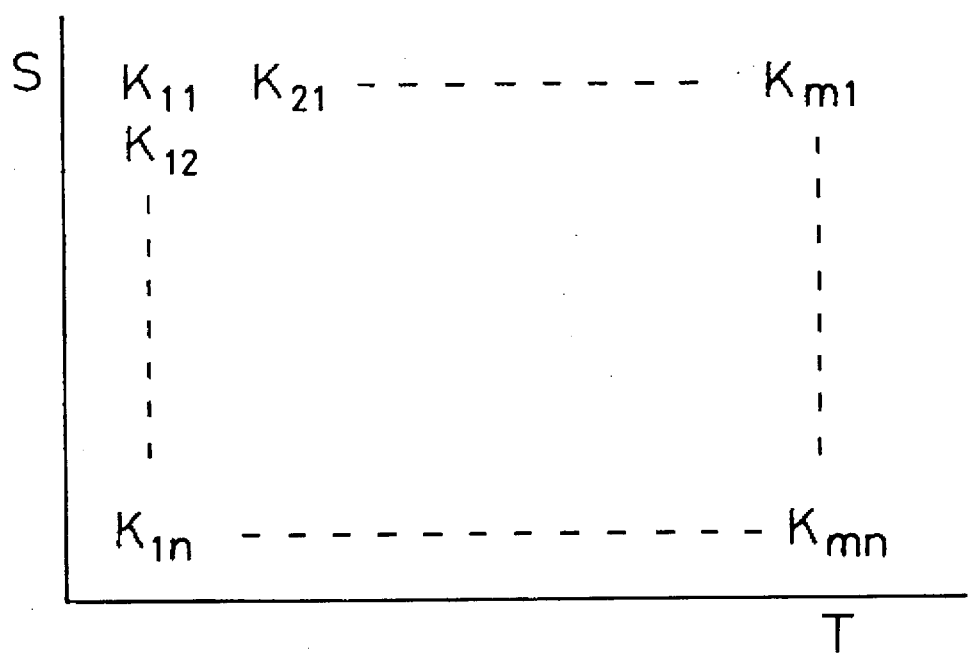
FIG. 16 is a view of a map of the rate of deterioration K.

In this embodiment, the rate of deterioration K when the air-fuel ratio is controlled by feedback to the stoichiometric air-fuel ratio is stored in advance in the ROM 22 in the form of a map as shown in FIG. 16 as a function of the degree of decrease $\ln(1/\psi)$ of the purification ratio $\psi$ of the exhaust gas, that is, the degree of catalyst performance deterioration S and the temperature T of the catalyst. Now, assuming that the air-fuel ratio is controlled by feedback to the stoichiometric air-fuel ratio, the degree of decrease $\ln(1/\psi)$ of the purification ratio $\psi$, that is, the degree of catalyst performance deterioration S, is $S_0$, and the curve corresponding to the temperature T of the catalyst is $m_2$, the rate of deterioration K at this time is expressed by the inclination of the curve $m_2$ at the point a. At this time, the degree of catalyst performance deterioration in the certain period $\Delta t$ is obtained by multiplying the rate of deterioration K at the point a by the certain period $\Delta t$.

Next, assume the current state is at the point b on the curve $m_2$ and becomes the state shown by the curve $m_3$ from this. At this time, the deterioration of the three-way catalyst 10 proceeds from the point c on the curve $m_3$ where the degree of decrease $\ln(1/\psi)$ is the same as the degree of decrease $\ln(1/\psi)$ of the purification ratio $\psi$ at the point b, that is, the point c on the curve $m_3$ where the degree of catalyst performance deterioration is the same as the degree of catalyst performance deterioration at the point b, so the degree of catalyst performance deterioration in a certain period $\Delta t$ at this time is obtained by multiplying the rate of deterioration K at the point c by the certain period $\Delta t$. The rate of deterioration K at these points a, b, and c are calculated from the map shown in FIG. 16.

On the other hand, when the air-fuel ratio is not controlled by feedback to the stoichiometric air-fuel ratio, that is, when the engine is operating under a high load where the air-fuel ratio is made rich or when it is decelerating and fuel injection is stopped, the rate of deterioration K is calculated from the map shown in FIG. 8.

Figure 17:
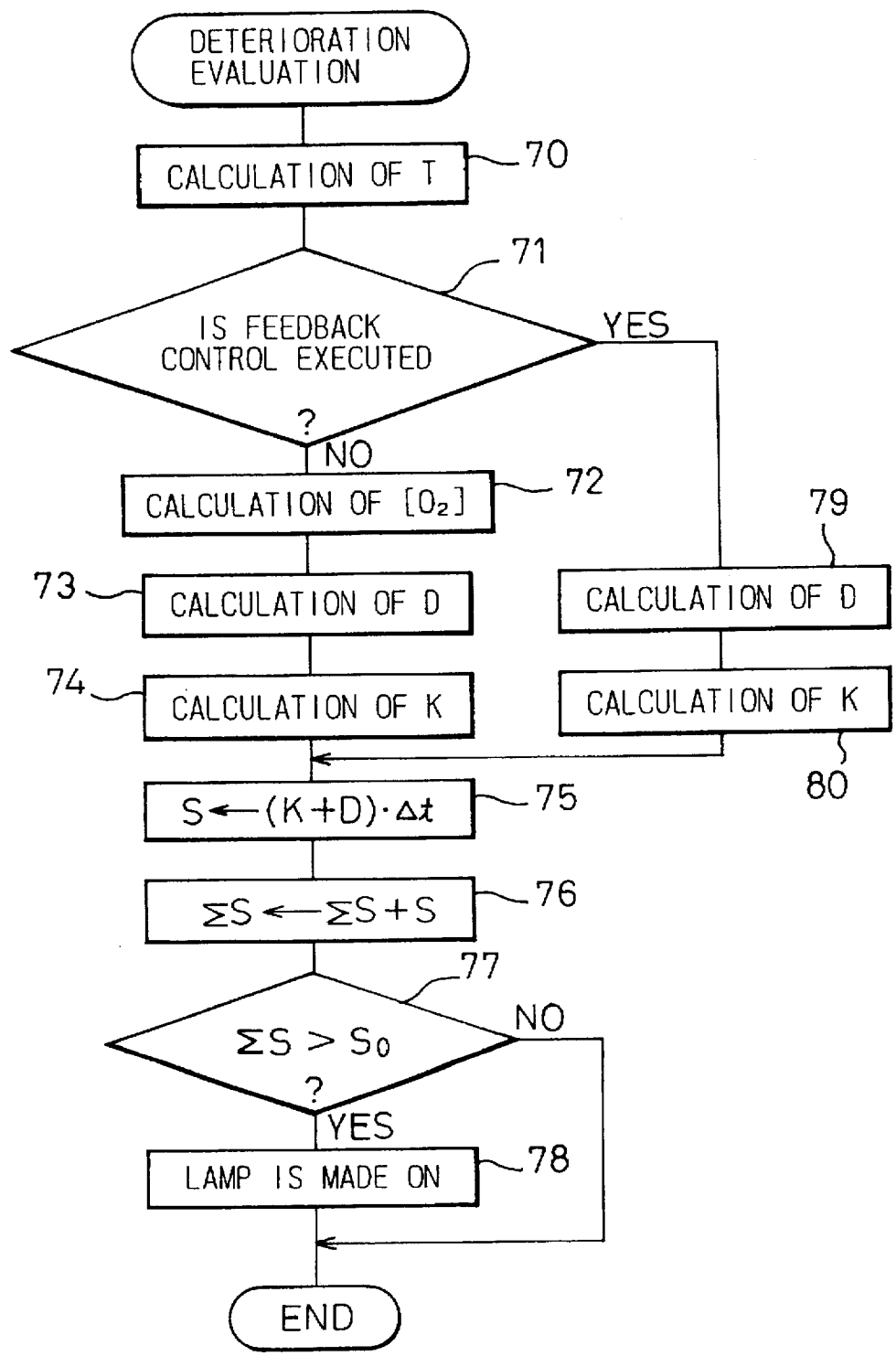
FIG. 17 is a flow chart of the evaluation of the deterioration.

FIG. 17 shows the routine for evaluation of deterioration of the three-way catalyst 10. This routine is executed by interruption at a predetermined interval.

Referring to FIG. 17, first, in step 70, the temperature T of the catalyst is calculated from an output signal of the temperature sensor 16. Next, in step 71, it is judged if feedback control is being performed to maintain the air-fuel ratio at the stoichiometric air-fuel ratio. When feedback control is not being performed, the routine proceeds to step 72, where the concentration of oxygen $[O_2]$ is calculated from an output signal of the air-fuel ratio sensor 15. Next, in step 73, the degree of catalyst performance deterioration D due to poisoning per unit time is calculated from the map shown in FIG. 9. Next, in step 74, the rate of deterioration K is calculated from the map shown in FIG. 8 based on the temperature T of the catalyst and the concentration of oxygen $[O_2]$. Next, in step 75, the time interval $\Delta T$ of the interruptions is multiplied by the total sum of the rate of deterioration K and the degree of catalyst performance deterioration D to calculate the degree of catalyst performance deterioration S in the interruption time intervals. Next, in step 76, the degree of catalyst performance deterioration S is accumulated, then in step 77 it is judged if the accumulated value $\Sigma S$ of the degree of catalyst performance deterioration S has exceeded the predetermined certain value $S_0$. When $\Sigma S > S_0$, it is judged that the three-way catalyst 10 has deteriorated and the routine proceeds to step 78, where the alarm lamp 18 is lit.

On the other hand, when it is judged in step 71 that feedback control is being performed, the routine proceeds to step 79, in which the degree of catalyst performance deterioration D due to the poisoning per unit time is calculated from the map shown in FIG. 9, then in step 80, the rate of deterioration K is calculated from the map shown in FIG. 16 based on the degree of decrease $\ln(1/\psi)$ of the purification ratio $\psi$, that is, the degree of catalyst performance deterioration S, and the temperature T of the catalyst. Next, the routine proceeds to step 75.

While the invention has been described by reference to specific embodiments chosen for purposes of illustration, it should be apparent that numerous modifications could be made thereto by those skilled in the art without departing from the basic concept and scope of the invention.

We claim:

1. A device for evaluating performance deterioration of an exhaust gas purifying catalyst, comprising:

temperature detecting means arranged in an exhaust passage for detecting a temperature of an exhaust gas purifying catalyst;

oxygen concentration detecting means arranged in the exhaust passage for detecting a concentration of oxygen contained in an exhaust gas;

calculating means for calculating a degree of catalyst performance deterioration in a predetermined period on the basis of the temperature of the catalyst detected by said temperature detecting means and the concentration of oxygen detected by said oxygen concentration detecting means;

accumulating means for cumulatively adding the degree of catalyst performance deterioration in said predetermined period to obtain an accumulated value; and evaluating means for evaluating the catalyst performance deterioration on basis of the accumulated value.

2. A device as set forth in claim 1, wherein said temperature detecting means comprises a temperature sensor arranged in the exhaust passage.

3. A device as set forth in claim 1, wherein said oxygen concentration detecting means comprises an air-fuel ratio sensor arranged in the exhaust passage.

4. A device as set forth in claim 1, wherein the degree of catalyst performance deterioration in said predetermined period is calculated based on a rate of catalyst performance deterioration, K.

5. A device as set forth in claim 4, wherein the degree of catalyst performance deterioration is expressed by the product of said predetermined period and K.

6. A device as set forth in claim 4, wherein K is calculated based on the following equation:

$$\ln K = C_1 - C_2 \cdot (1/T) + \alpha \ln [O_2]$$

where, $C_1$, $C_2$, and $\alpha$ are constants, T is an absolute temperature of the catalyst, and $[O_2]$ is the concentration of oxygen in the exhaust gas.

7. A device as set forth in claim 6, wherein K is stored in advance as a function of an absolute temperature T of the catalyst and a concentration of oxygen $[O_2]$ in the exhaust gas.

8. A device as set forth in claim 4, wherein K is expressed by a rate of change of a purification ratio $\psi$ of the exhaust gas shown by the following equation:

$$\psi = \psi_0 - A \cdot \exp(-B/T) \cdot [O_2]^\alpha \cdot t^n$$

where, $\psi_0$ is a purification ratio of the exhaust gas at the time of start of use of the catalyst, A, B, and $\alpha$ are constants, T is an absolute temperature of the catalyst, $[O_2]$ is a concentration of oxygen in the exhaust gas, t is an operating time, and m is a positive value of not more than 1.0.

9. A device as set forth in claim 8, wherein the rate of change of $\psi$ is a function of $\psi$ of the exhaust gas, an absolute temperature T of the catalyst, and a concentration of oxygen $[O_2]$ in the exhaust gas and wherein K is stored in advance as a function of $\psi$ of the exhaust gas, an absolute temperature T of the catalyst, and a concentration of oxygen $[O_2]$ in the exhaust gas.

10. A device as set forth in claim 4, wherein K is expressed by a rate of change of a degree of decrease ln $(1/\psi)$ of a purification ratio of the exhaust gas shown by the following equation:

$$\ln(1/\psi)=C \cdot t^m$$

where, $\psi$ is a purification ratio of the exhaust gas, C is a constant, t is an operating time, and m is a positive number.

11. A device as set forth in claim 10, wherein the rate of change of ln $(1/\psi)$ is a function of ln $(1/\psi)$ and an absolute temperature T of the catalyst and wherein a rate of catalyst performance deterioration K is stored in advance as a function of ln $(1/\psi)$ and the absolute temperature T of the catalyst.

12. A device as set forth in claim 4, wherein means for judging if an air-fuel ratio is being subjected to feedback control is provided and wherein K is found from the rate of change of ln $(1/\psi)$ shown in the following equation (1) when an air-fuel ratio is being subjected to feedback control, while K is calculated from the following equation (2) when an air-fuel ratio is not being subjected to feedback control:

(1) $\ln(1/\psi)=C \cdot t^m$ (2) $\ln K = C_1 - C_2 \cdot (1/T) + \alpha \ln[O_2]$ where, $\psi$ is a purification ratio of the exhaust gas, C, $C_1$, $C_2$, and $\alpha$ are constants, t is an operating time, m is a positive number, T is an absolute temperature of the catalyst, and $[O_2]$ is a concentration of oxygen in the exhaust gas.

13. A device as set forth in claim 1, wherein the degree of catalyst performance deterioration includes a degree of catalyst performance deterioration due to a catalyst poison.

14. A device as set forth in claim 13, wherein the degree of catalyst performance deterioration due to a catalyst poison per unit time is stored in advance as a function of an engine load and engine speed.

* * * * *